(12) United States Patent
Brown et al.

(10) Patent No.: US 11,626,822 B2
(45) Date of Patent: Apr. 11, 2023

(54) LOW-SPEED HIGH TORQUE MOTOR CONTROL AND FOAM SYSTEM

(71) Applicant: Hale Products, Inc., Ocala, FL (US)

(72) Inventors: William J. Brown, The Villages, FL (US); George H. M. Clementson, III, Summerfield, FL (US)

(73) Assignee: HALE PRODUCTS, INC., Collegeville, PA (US)

( * ) Notice: Subject to any disclaimer, the term of this patent is extended or adjusted under 35 U.S.C. 154(b) by 73 days.

(21) Appl. No.: 17/082,301

(22) Filed: Oct. 28, 2020

(65) Prior Publication Data

US 2021/0126566 A1 Apr. 29, 2021

Related U.S. Application Data

(60) Provisional application No. 62/926,755, filed on Oct. 28, 2019.

(51) Int. Cl.
*H02P 6/28* (2016.01)
*H02P 6/16* (2016.01)
(Continued)

(52) U.S. Cl.
CPC .................. *H02P 6/28* (2016.02); *A62C 5/02* (2013.01); *A62C 37/04* (2013.01); *A62C 37/50* (2013.01);
(Continued)

(58) Field of Classification Search
CPC .... H02P 6/28; H02P 6/16; H02P 27/05; H02P 3/025; H02P 27/08; A62C 5/02;
(Continued)

(56) References Cited

U.S. PATENT DOCUMENTS 2,275,500 A 3/1942 Broadhurst
2,275,502 A 3/1942 Broadhurst
(Continued)

FOREIGN PATENT DOCUMENTS

DE 4009560 A1 9/1991
JP H02150581 A 6/1990
WO 2017024272 A1 2/2017

OTHER PUBLICATIONS

Int'l Search Report and Written Opinion dated Mar. 12, 2021 in Int'l Application No. PCT/US20/57678.
(Continued)

*Primary Examiner* — Kawing Chan
*Assistant Examiner* — Bradley R Brown
(74) *Attorney, Agent, or Firm* — Panitch Schwarze Belisario & Nadel LLP (57) ABSTRACT

A fire suppression system includes a motor and a foam pump. The foam pump is driven by the motor to inject one or more chemical additives from an off-board additive container into a discharge conduit. A bypass valve is in fluid communication with the output of the foam pump. One or more sensors are configured to measure at least one operating condition of the foam pump. A controller is in communication with the one or more sensors and is operatively connected to the bypass valve. The controller is configured to determine, based on data received from the one or more sensors regarding the at least one operating condition of the foam pump, whether the foam pump is experiencing a loss of prime, and to open the bypass valve in response. The motor may also selectively operate in one of two modes depending on the rotational speed and torque required.

18 Claims, 7 Drawing Sheets

(51) Int. Cl.

| | |
|---|---|
| *H02P 27/05* | (2006.01) |
| *F04B 49/06* | (2006.01) |
| *F04B 49/035* | (2006.01) |
| *F04B 49/02* | (2006.01) |
| *F04B 17/03* | (2006.01) |
| *G01F 23/28* | (2006.01) |
| *G01F 1/56* | (2006.01) |
| *A62C 5/02* | (2006.01) |
| *G05D 7/06* | (2006.01) |
| *A62C 37/50* | (2006.01) |
| *A62C 37/36* | (2006.01) |

(52) U.S. Cl.
CPC ............ *F04B 17/03* (2013.01); *F04B 49/022* (2013.01); *F04B 49/035* (2013.01); *F04B 49/065* (2013.01); *G01F 1/56* (2013.01); *G01F 23/28* (2013.01); *G05D 7/0617* (2013.01); *H02P 6/16* (2013.01); *H02P 27/05* (2013.01)

(58) Field of Classification Search
CPC ......... A62C 37/04; A62C 37/50; F04B 17/03; F04B 49/022; F04B 49/035; F04B 49/065; F04B 15/00; F04B 49/20; F04B 19/06; G01F 1/56; G01F 23/28; G05D 7/0617
See application file for complete search history.

(56) References Cited

U.S. PATENT DOCUMENTS

| | | | |
|---|---|---|---|
| 2,961,968 | A | 11/1960 | Thomas |
| 4,914,371 | A | 4/1990 | Shibata et al. |
| 5,491,978 | A | 2/1996 | Young et al. |
| 5,729,102 | A | 3/1998 | Gotou et al. |
| 5,739,651 | A | 4/1998 | Miyazawa et al. |
| 5,838,124 | A | 11/1998 | Hill |
| 5,847,530 | A | 12/1998 | Hill |
| 5,872,434 | A | 2/1999 | Hill |
| 6,034,493 | A | 3/2000 | Boyd et al. |
| 6,239,564 | B1 | 5/2001 | Boe et al. |
| 6,586,898 | B2 | 7/2003 | King et al. |
| 6,682,313 | B1 | 1/2004 | Sulmone |
| 6,982,534 | B2 | 1/2006 | Hahn et al. |
| 7,064,513 | B2 | 6/2006 | Fenley |
| 7,102,306 | B2 | 9/2006 | Hamaoka et al. |
| 7,205,738 | B2 | 4/2007 | Chapman et al. |
| 7,315,142 | B2 | 1/2008 | Lindemann et al. |
| 7,514,894 | B2 | 4/2009 | Hoogzaad |
| 7,573,224 | B2 | 8/2009 | Crabill et al. |
| 7,609,016 | B2 | 10/2009 | Kraus |
| 7,764,032 | B2 | 7/2010 | Crabill et al. |
| 8,159,171 | B2 | 4/2012 | Cheng |
| 8,226,372 | B2 | 7/2012 | Hamaoka et al. |
| 8,237,385 | B2 | 8/2012 | Street |
| 8,339,077 | B2 | 12/2012 | Brown |
| 9,190,940 | B2 | 11/2015 | Markham |
| 9,317,019 | B2 | 4/2016 | Huang |
| 9,413,276 | B2 | 8/2016 | Miller |
| 10,056,852 | B2 | 8/2018 | Matthews et al. |
| 10,632,489 | B1 | 4/2020 | Wang |
| 2004/0177975 | A1 | 9/2004 | Laskaris et al. |
| 2007/0286736 | A1 | 12/2007 | Grady et al. |
| 2008/0099213 | A1 | 5/2008 | Morrow et al. |
| 2010/0065286 | A1* | 3/2010 | Hosfield ................ A62C 27/00 169/13 |
| 2011/0256005 | A1 | 10/2011 | Takeoka et al. |
| 2011/0279070 | A1 | 11/2011 | Tanaka et al. |
| 2012/0200244 | A1 | 8/2012 | Otokawa et al. |
| 2013/0169196 | A1* | 7/2013 | Markham ................ H02P 6/08 318/3 |
| 2019/0073256 | A1 | 3/2019 | Iwami et al. |
| 2019/0277010 | A1 | 9/2019 | Laskaris |
| 2020/0116170 | A1 | 4/2020 | Schmidt et al. |
| 2020/0158115 | A1 | 5/2020 | Mei |

OTHER PUBLICATIONS

Int'l Search Report and Written Opinion dated Oct. 12, 2021 in Int'l Application No. PCT/US2021/037905.
Written Opinion of the International Examining Authority, dated Sep. 2, 2022 in Int'l Application No. PCT/US2021/037905.
Int'l Preliminary Report on Patentability dated Oct. 20, 2022 in Int'l Application No. PCT/US2021/037905.

* cited by examiner

//LOW-SPEED HIGH TORQUE MOTOR CONTROL AND FOAM SYSTEM

CROSS-REFERENCE TO RELATED APPLICATIONS

This application claims priority to U.S. Provisional Application No. 62/926,755, filed Oct. 28, 2019, entitled "Low Speed High Torque Motor Control," the entire contents of which are incorporated by reference herein.

BACKGROUND

Several embodiments described herein relate generally to control of a motor, and more particularly, control of a brushless direct-current (DC) motor that is operated at low speeds but which nonetheless supplies sufficient torque for the intended application. Such motor control is particularly suitable for injection of fire suppression additives (e.g., foam) into a water stream at low pressure. Further embodiments described herein relate generally to systems for injecting fire suppression additives, and more particularly, to systems that can easily and effectively add fire suppression foam from either on-board tanks or off-board containers.

Brushless DC or electronically-commutated motors are commonly used in many applications, including in foam proportioners, often found on firefighting vehicles, where a fire suppression foam is injected into a water stream to aid in extinguishing a fire. Foam injection is a method typically utilized when water resources are difficult to reach or are limited. In such circumstances, additives such as Class A foam can be used and are often proportioned at low rates, such as 0.1-0.3%. Reduced water availability can also lead to reduced or low flow rate nozzles, where actual water or agent flow rate can be as low as 6-15 gallons per minute. The foam injection pump or proportioner therefore should be capable of injecting at the lowest percentage at the lowest flows, and at the other extreme, at the highest percentage at highest flow rates. When the water stream is at high pressure, a brushless DC motor is ideal for operating a pump to inject the fire suppression foam. However, in such applications, the motor is typically operating at high speed. As the speed of the motor decreases, the motor operates at reduced torque. At lower water flow rates, the motor must turn very slowly, sometimes even at single digit revolutions per minute (RPMs). Traditional brushless DC motors have insufficient torque at such speeds to operate the foam pump.

To overcome these issues, other types of systems have previously been used. For example, hydrostatic drives can be used to operate the foam pump at low speeds, but such systems are physically large, heavy, and complex, making them difficult to implement on different types of firefighting vehicles. Stepper motors are capable of operating a pump at low speeds but cannot operate at high enough speeds for high flow applications. Some systems have utilized a two pump/motor arrangement, where one pump and motor are utilized for low speed applications and a second pump and motor are utilized for higher speeds. Although smaller than the hydrostatic drives, dual pumps and motors still occupy a larger space than a single motor system and are more complex.

A further issue arises during extended operation, which can drain the on-board chemical additive storage tank(s). Additive(s) can then be drawn from external, off-board containers, for example, a five gallon pail, a fifty-five gallon drum, a tote tank containing hundreds of gallons, or the like. Such external containers may also be used when specific hazards occur that require different additives. Priming of the pump therefore becomes important when switching among external containers. "Foaming" type chemical additives are more difficult to prime into the pump because compressible bubbles can easily form and "air bind" the pump as it tries to pull the additive from the container. A venting mechanism, operated by a bypass valve, is typically provided to allow air to escape between the pump and the injection point with the water stream.

It is desired to provide a single motor with a high turn-down ratio that can be reliably operated anywhere from about 1 RPM to thousands of RPMs with enough torque to meet the needs of the desired application at any speed, in particular fire suppression foam injection. It is further desired to provide a fire suppression additive system that allows for easy and effective use of firefighting additives, such as foams, from either on-board tanks or off-board containers.

BRIEF SUMMARY

Briefly stated, one embodiment comprises a system including a brushless direct current electric (BLDC) motor having a plurality of phases and a motor controller operatively connected to the plurality of phases of the BLDC motor and configured to selectively power rotation of the BLDC motor via the plurality of phases in a first mode and a second mode. When the motor controller powers rotation of the BLDC motor in the first mode, the motor controller is configured to (a) determine a current rotational position of the BLDC motor, (b) determine a subsequent rotational position of the BLDC motor to which the BLDC motor is to be rotated, (c) apply a first pulse width modulation (PWM) setting to one or more of the plurality of phases to cause the BLDC motor to rotate toward the subsequent rotational position, (d) responsive to detecting that the BLDC motor has reached the subsequent rotational position, apply a second PWM setting different from the first PWM setting to the one or more of the plurality of phases until expiration of a timer of predetermined duration, and (e) after expiration of the timer, return to step (a). When the motor controller powers rotation of the BLDC motor in the second mode, the motor controller is configured to (i) determine a current rotational position of the BLDC motor, (ii) determine a subsequent rotational position of the BLDC motor to which the BLDC motor is to be rotated, (iii) apply a third PWM setting to one or more of the plurality of phases to cause the BLDC motor to rotate toward the subsequent rotational position, and (iv) responsive to detecting that the BLDC motor has reached the subsequent rotational position, return to step (i).

In one aspect, the system further includes a foam pump having an input configured for fluid communication with at least one additive source and an output configured for fluid communication with a discharge conduit. The foam pump is driven by the BLDC motor to inject one or more chemical additives from the at least one additive source into the discharge conduit. In another aspect, the BLDC motor and the foam pump are provided in a common housing. In another aspect, the system includes a source selector valve disposed upstream of the foam pump input and configured to enable selection of one of a plurality of additive sources for fluid communication with the foam pump input.

In another aspect, the system further includes a plurality of position sensors operatively connected to the motor controller and configured to detect the current rotational position of the BLDC motor.

In another aspect, the third PWM setting is different from the first and second PWM settings.

Another embodiment comprises a fire suppression system includes a motor and a foam pump having an input configured for fluid communication with at least one off-board additive container and an output configured for fluid communication with a discharge conduit. The foam pump is driven by the motor to inject one or more chemical additives from the off-board additive container into the discharge conduit. A bypass valve is in fluid communication with the output of the foam pump. One or more sensors are configured to measure at least one operating condition of the foam pump. A controller is in communication with the one or more sensors and is operatively connected to the bypass valve. The controller is configured to determine, based on data received from the one or more sensors regarding the at least one operating condition of the foam pump, whether the foam pump is experiencing a loss of prime. The controller is further configured to open the bypass valve in response to determining the loss of prime by the foam pump.

In one aspect the one or more sensors include a fill level sensor configured for placement within the off-board additive container. The fill level sensor is configured to measure a level of additive within the off-board additive container. The controller is configured to determine the loss of prime by the foam pump based at least on finding the measured additive level below a predetermined threshold. In another aspect, the fill level sensor is one of an optical, inductive, or capacitive level sensor.

In another aspect, the controller is further configured to output an alert to the user in response to determining the loss of prime by the foam pump. In another aspect, the alert is at least one of a visual or an audible alert.

In another aspect, the one or more sensors include a flowmeter disposed downstream of, and in fluid communication with, the output of the foam pump. The flowmeter is configured to measure a flow rate from the output of the foam pump. The controller is configured to determine the loss of prime by the foam pump based at least on finding the measured flow rate below a predetermined threshold.

In another aspect, the one or more sensors include a pressure sensor disposed downstream of, and in fluid communication with, the output of the foam pump. The pressure sensor is configured to measure a pressure level from the output of the foam pump. The controller is configured to determine the loss of prime by the foam pump based at least on finding the measured pressure level below a predetermined threshold.

In another aspect, the controller is further configured to determine, based on data received from the one or more sensors regarding the at least one operating condition of the foam pump, whether the foam pump has regained prime. The controller is further configured to close the bypass valve in response to determining the regain of prime by the foam pump.

In another aspect, the controller is further configured to reduce an operating speed of the foam pump in response to determining the loss of prime by the foam pump.

In another aspect, at least one of the one or more sensors is configured for wireless communication with the controller.

In another aspect, the fire suppression system further includes a source selector valve disposed upstream of the foam pump input and configured to selectively enable and disable fluid communication between the off-board additive container and the input of the foam pump.

In another aspect, the fire suppression system further includes an off-board conduit having a first end in fluid communication with the input of the foam pump and a second end fitted with a suction wand.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one." Unless stated otherwise, terms such as "first" and "second" are used to arbitrarily distinguish between the elements such terms describe. Thus, these terms are not necessarily intended to indicate temporal or other prioritization of such elements.

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
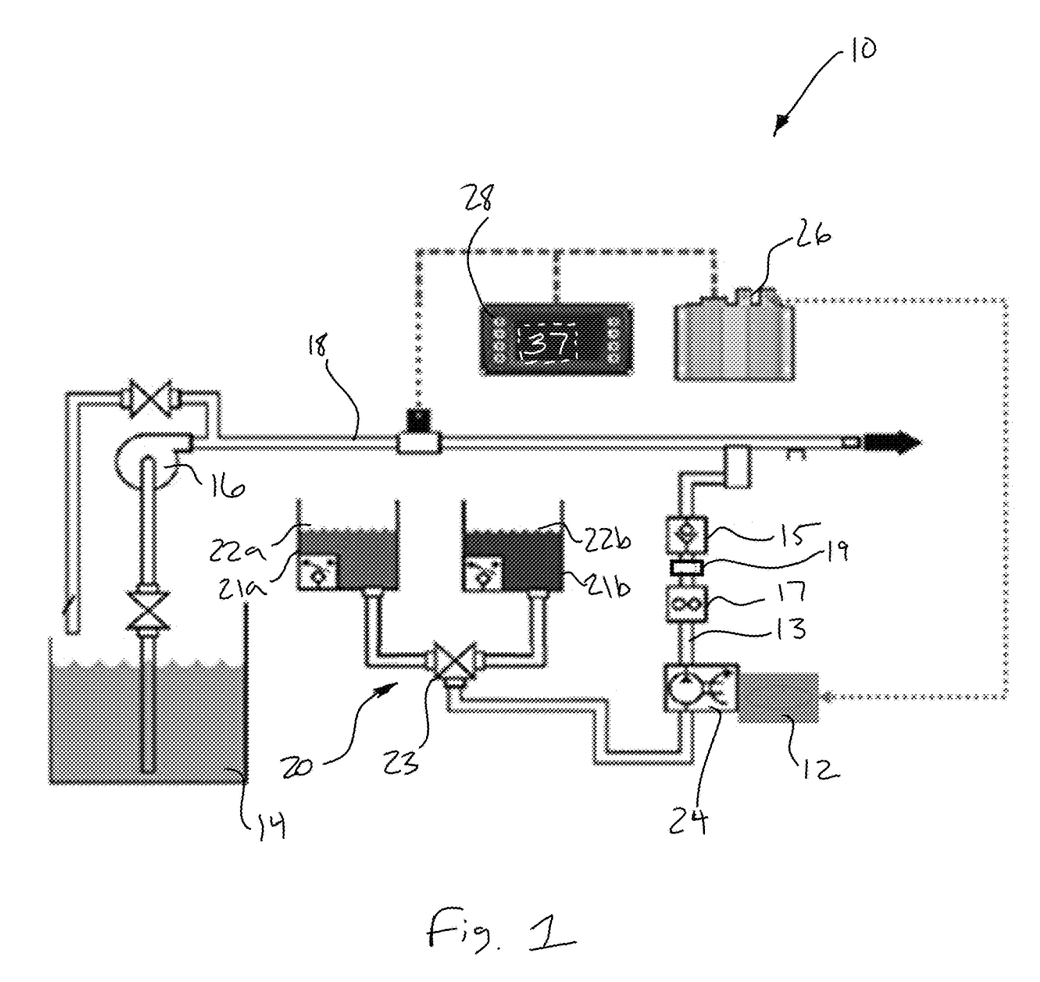
FIG. 1 is a schematic block diagram of a fire suppression system utilizing a motor control in accordance with an example embodiment.

Referring to FIG. 1, there is shown an exemplary fire suppression system, generally designated 10, utilizing a motor 12 controlled in accordance with a preferred embodiment of the present invention. The fire suppression system 10 preferably includes a water source 14 (such as a water tank) coupled to a water pump 16 responsible for moving water from the water source 14 to a discharge conduit 18. The water tank 14 may be filled through a connection to a positive water pressure supply (not shown), such as a conventional fire hydrant, although the tank 14 may, in some applications, be omitted such that the water is provided directly to the discharge conduit 18 by the hydrant supply. The fire suppression system 10 may be mounted on a vehicle (not shown), such as a fire truck, having an engine (not shown) that may be operatively connected to the water pump 16 for driving or powering of the water pump 16.

Figure 6:
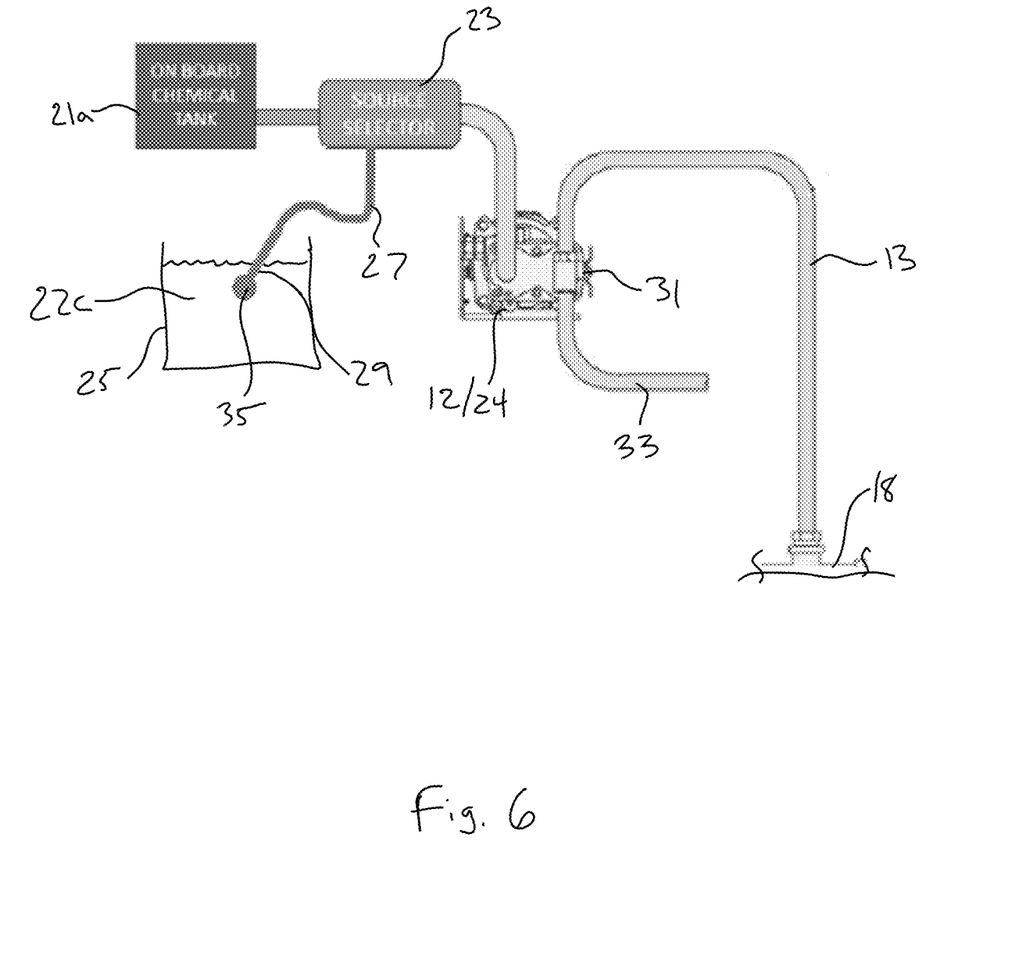
FIG. 6 is a schematic block diagram of a portion of a fire suppression system utilizing an off-board foam container in accordance with an example embodiment.

The fire suppression system 10 further preferably includes an additive proportioning system 20 that provides one or more chemical additives (e.g., foamants) 22a, 22b that may be stored in on-board tanks 21a, 21b or in one or more off-board containers 25 (FIG. 6). The additive proportioning system 20 is in fluid communication with the discharge conduit 18 via a foam pump 24 driven by the motor 12, which, like the water pump 16, may be powered by the vehicle engine, although other power sources may be used as well. The motor 12 and foam pump 24 may be provided in a combined housing, as shown, for example, in FIG. 6. A foam injection conduit 13 is provided having one end connected to an output of the foam pump 24, and an opposite end connected to the discharge conduit 18. A one-way check valve 15 is preferably provided proximate the connection between the foam injection conduit 13 and the discharge conduit 18 to prevent water in the discharge conduit 18 from diverting into the foam injection conduit 13 toward the foam pump 24.

The motor 12 may be in communication with a motor controller 26, which can be integrated with the motor 12, mounted at or proximate thereto, or mounted elsewhere on the vehicle. The motor 12 and motor controller 26 may communicate either wirelessly or via a wired connection. An operator interface 28 may be integrated with the motor controller 26 or may be mounted separately and in communication with the motor controller 26 via a wired or wireless connection. The operator interface 28 may be a graphical user interface (GUI) with a touchscreen, push buttons, switches, or the like. In use, an operator may, via the operator interface 28, select a desired speed for the motor 12, as well as the specification of one or more foamants 22a, 22b, and other related parameters. The motor controller 26 then operates the motor 12 in accordance with the selected parameters, as described in further detail below, such that the foam pump 24 injects the selected foamant(s) 22a, 22b into the discharge conduit 18 to mix with the flowing water.

Figure 2:
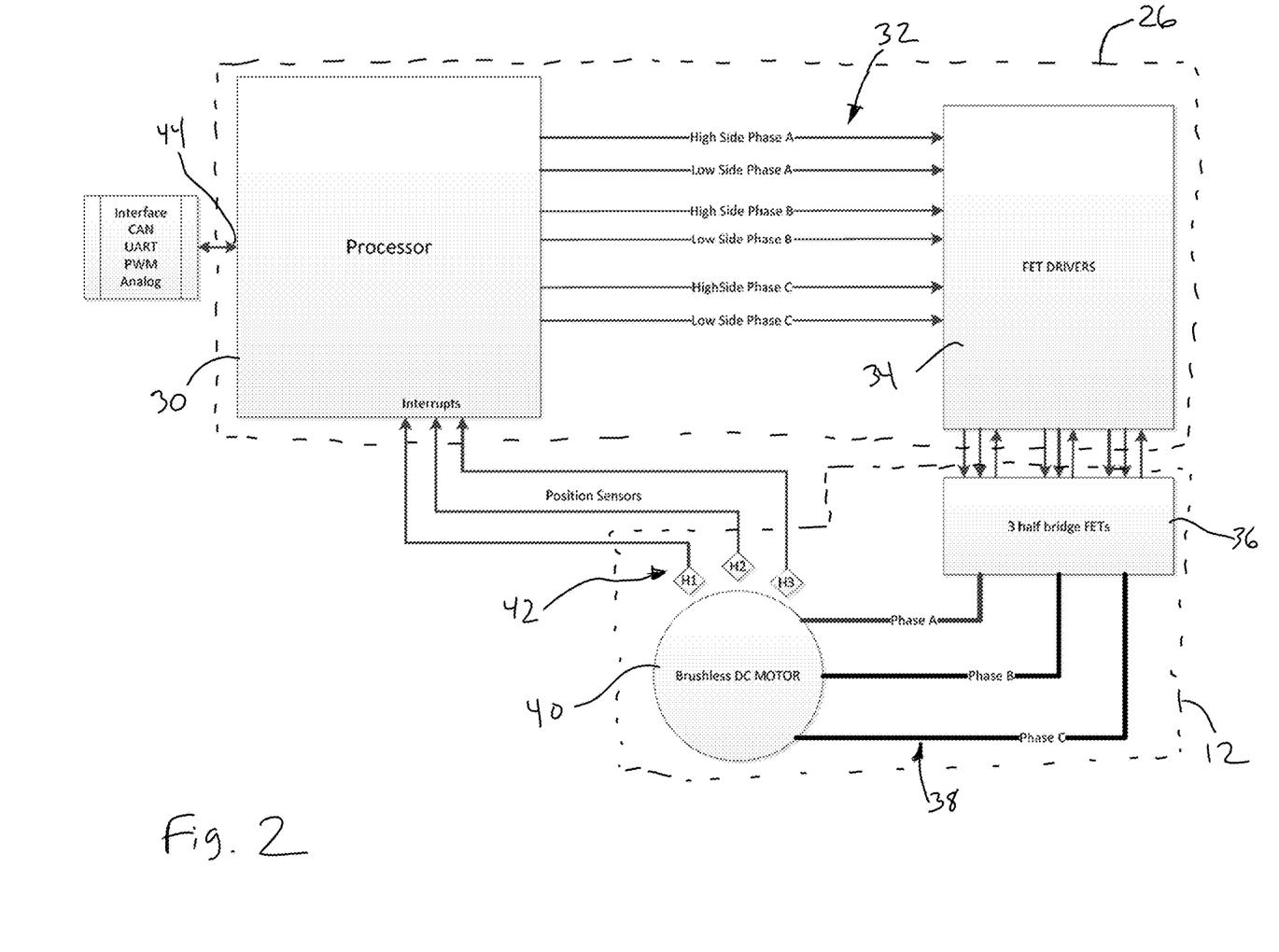
FIG. 2 is a schematic block diagram of a motor and motor controller in accordance with an example embodiment.

Referring to FIG. 2, the motor controller 26 preferably includes a processor 30 or other like computing device configured to receive input from various sensors and the operator interface 28 and output signals for adjusting and controlling the motor 12 accordingly. While shown as a single processor 30, the functionality may also be divided among multiple devices. The processor 30 preferably includes a plurality of phase outputs 32 coupled to a plurality of drivers 34 to drive a corresponding number of switches (for example, a plurality of FETs) 36 in the motor 12 to deliver power to the phases 38 of a brushless DC motor 40. As shown in FIG. 2, the brushless DC motor 40 has three phases 38, but more or fewer phases may be utilized, as desired.

As is conventional, a plurality of position sensors 42 may be placed to detect the position of the brushless DC motor 40 as it rotates. The position sensors 42 may be of any type, such as Hall-effect switches, optical encoders, giant magnetoresistance sensors, or the like, and preferably feed back to the processor 30 to provide interrupt signals for triggering phase switching during operation of the brushless DC motor 40. Position of the brushless DC motor 40 can also be determined in ways excluding the use of such physical position sensors, such as by detecting back-EMF in the passive phase 38 of the motor 12.

The processor 30 may also be in communication with other devices via one or more ports 44 capable of operation as one of various types of interfaces, for example, a connected area network (CAN), Universal Asynchronous Receiver/Transmitter (UART), pulse-width modulation (PWM), other conventional analog interfaces, or the like.

While the phase outputs 32 and drivers 34 are shown to be housed within the motor controller 26 and the switches 36 and position sensors 42 are shown to be within the motor 12, such components can be arranged in other configurations and housed separately from one another or housed together in other combinations. For example, the drivers 34 may be housed within the motor 12, or the switches 36 may reside in the motor controller 26.

During ordinary operation, at low rotation speeds (for example, single digit RPMs, although higher speeds may also suffer from this drawback depending on the load and the capabilities of the brushless DC motor 40), the brushless DC motor 40 will not have sufficient torque to drive the foam pump 24. To address this issue, the motor controller 26 is programmed to, at least at selected low motor speeds, operate the brushless DC motor 40 such that application of commutating current to various phases 38 of the brushless DC motor 40 is based on both position and time. That is, the brushless DC motor 40 is preferably commutated at periodic time intervals instead of as a sole result of detected position. As will be described in more detail below, a timer is set to commutate the brushless DC motor 40 to its next position at periodic intervals, and once the brushless DC motor 40 reaches the next position, the motor controller 26 will hold the brushless DC motor 40 at that position until the next interval.

Preferably, the motor 12 can operate in this first, "slow" mode when low speeds are selected, while the motor 12 preferably operates in a second, "normal" mode at more conventional brushless DC motor speeds at which sufficient torque is generated. The threshold may be established as the speed at which the brushless DC motor 40 does not reach its next position before the timer fires again. This threshold is motor and load dependent and may be predetermined and stored in the motor controller 26 or may be determined during operation based on measured loads, the determined condition of the brushless DC motor 40, and the like. The motor controller 26 also preferably is able to select or switch between the first and second modes of operation based on the speed selected at the operator interface 28, detected speed changes, detected motor effectiveness, or the like. Alternatively, the user may be able to manually select between modes at the operator interface 28. In still other embodiments, the motor 12 may operate in the first mode at all speeds of the brushless DC motor 40.

PWM is preferably utilized to control the power of the brushless DC motor 40 motion, and preferably implements two PWM settings: a first "moving" PWM setting and a second "holding" PWM setting. Preferably, the first PWM setting is applied when initially moving the brushless DC motor 40 from its current position to the next position. Then, the second PWM setting is preferably applied when the brushless DC motor 40 arrives at the next position and continues until the timer fires again, at which time the process repeats. The second PWM setting is preferably lower than the first PWM setting and is designed to reduce the current draw while the brushless DC motor 40 is waiting to advance to the next position, thereby reducing overall current draw by the motor 12 and heat generation, while still providing sufficient torque at low speeds. Both the first and second PWM settings, while adjustable between 0-100% duty cycle, are preferably selected to be as low as possible for the desired application, thereby conserving as much current as possible. Current conservation is particularly important when implementing the motor 12 in a vehicle, where power is a limited resource restricted by the typical 12 or 24 V power supply. The motor controller 26 may transition between the first and second PWM settings substantially immediately upon detection of necessary conditions or may change gradually. In alternative embodiments, additional PWM settings may be utilized during operation, if desired. Moreover, when the motor 12 is to be operated in the second "normal" mode, the first PWM setting is preferably applied, although a different PWM setting from those used in the first "slow" mode may be used instead.

For example, a ten pole brushless DC motor 40 will have thirty positions in one rotation (6 steps per internal cycle multiplied by 5 pole pairs). Thus, in the first "slow" mode of operation, the motor controller 26 will commutate the brushless DC motor 40 by 12° (360°/30) using the first PWM setting. The brushless DC motor 40 will then be held at this position using the second PWM setting until the timer fires again, causing the brushless DC motor 40 to commutate another 12° under the first PWM setting, and so on.

Figure 3:
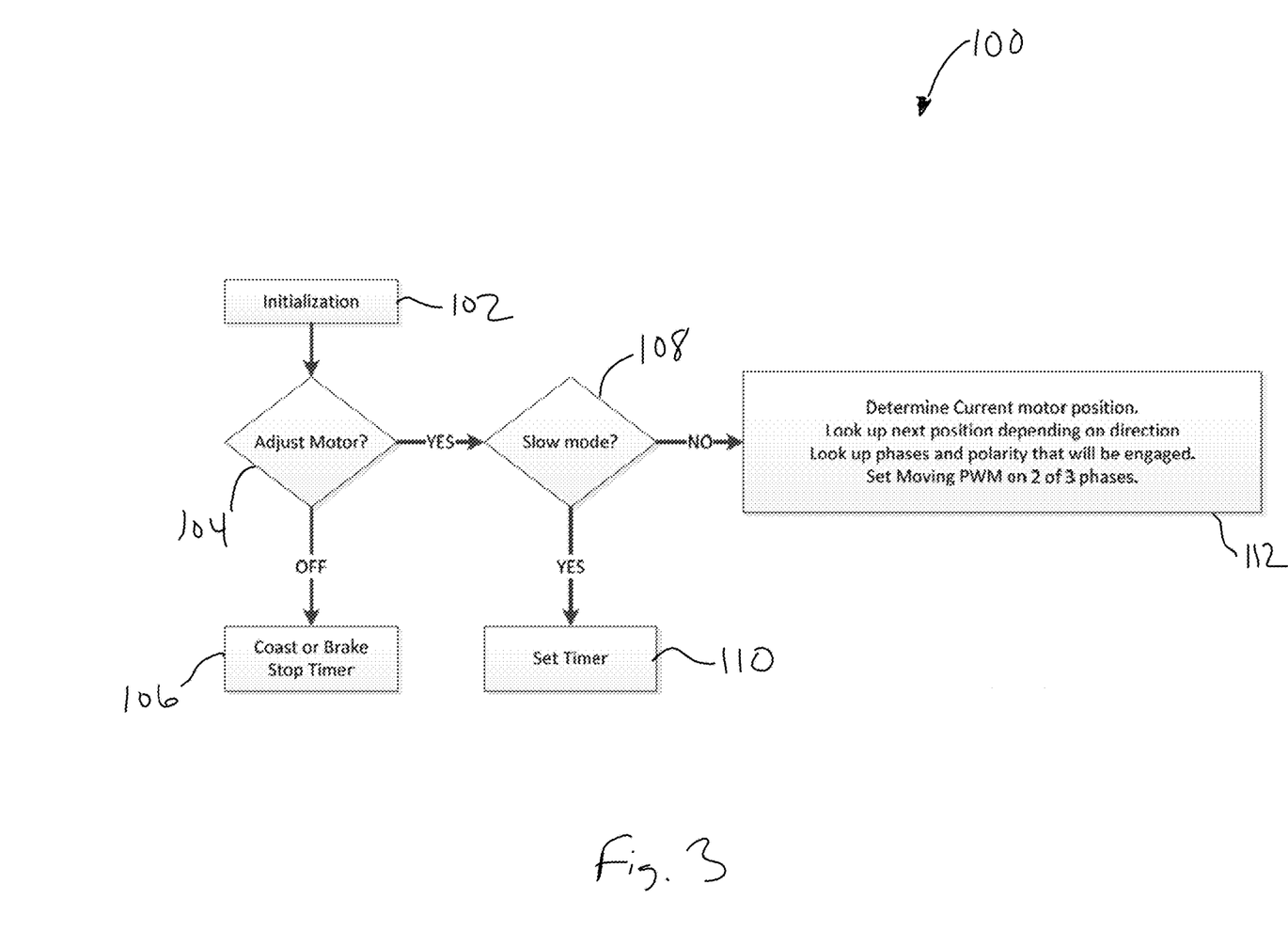
FIG. 3 is a flow chart of an exemplary method for operating the motor controller of FIG. 1.

FIG. 3 shows an exemplary method 100 executed by the motor controller 26 when selecting a new motor speed. At step 102, the motor controller 26 may be initialized, either by powering on, waking from sleep, receiving a speed adjustment or a power-off instruction, or the like. At step 104, the motor controller 26 preferably determines whether the brushless DC motor 40 requires adjustment. If the motor controller 26 determines that the brushless DC motor 40 is to be shut off (assuming the brushless DC motor 40 is currently in motion), the motor controller 26 at step 106 may affirmatively brake the brushless DC motor 40 or allow the brushless DC motor 40 to slow to a halt. In addition, if the timer is running, the motor controller 26 will preferably stop the timer at step 106.

If the motor controller 26 determines that the brushless DC motor 40 requires adjustment at step 104, then the motor controller 26 preferably moves to step 108 to determine if the motor 12 is to operate in the first "slow" mode. If so, the motor controller 26 may move to step 110 and set the timer according to the selected speed. The motor controller 26 then may enter a first mode method 200 (e.g., FIG. 4), which will be described in further detail below. If, at step 108, the motor controller 26 determines that the motor 12 is not to be in the first mode, but instead, for example, the second mode, the motor controller 26 preferably moves to step 112. At step 112, the motor controller 26 preferably determines the current position of the brushless DC motor 40, determines the next position depending on the rotation direction, determines the phases 38 and polarities to be applied, and applies the first "moving" PWM setting accordingly. From this point, the motor 12 would preferably be operated in the second mode, i.e., in typical fashion for a brushless DC motor.

Figure 4:
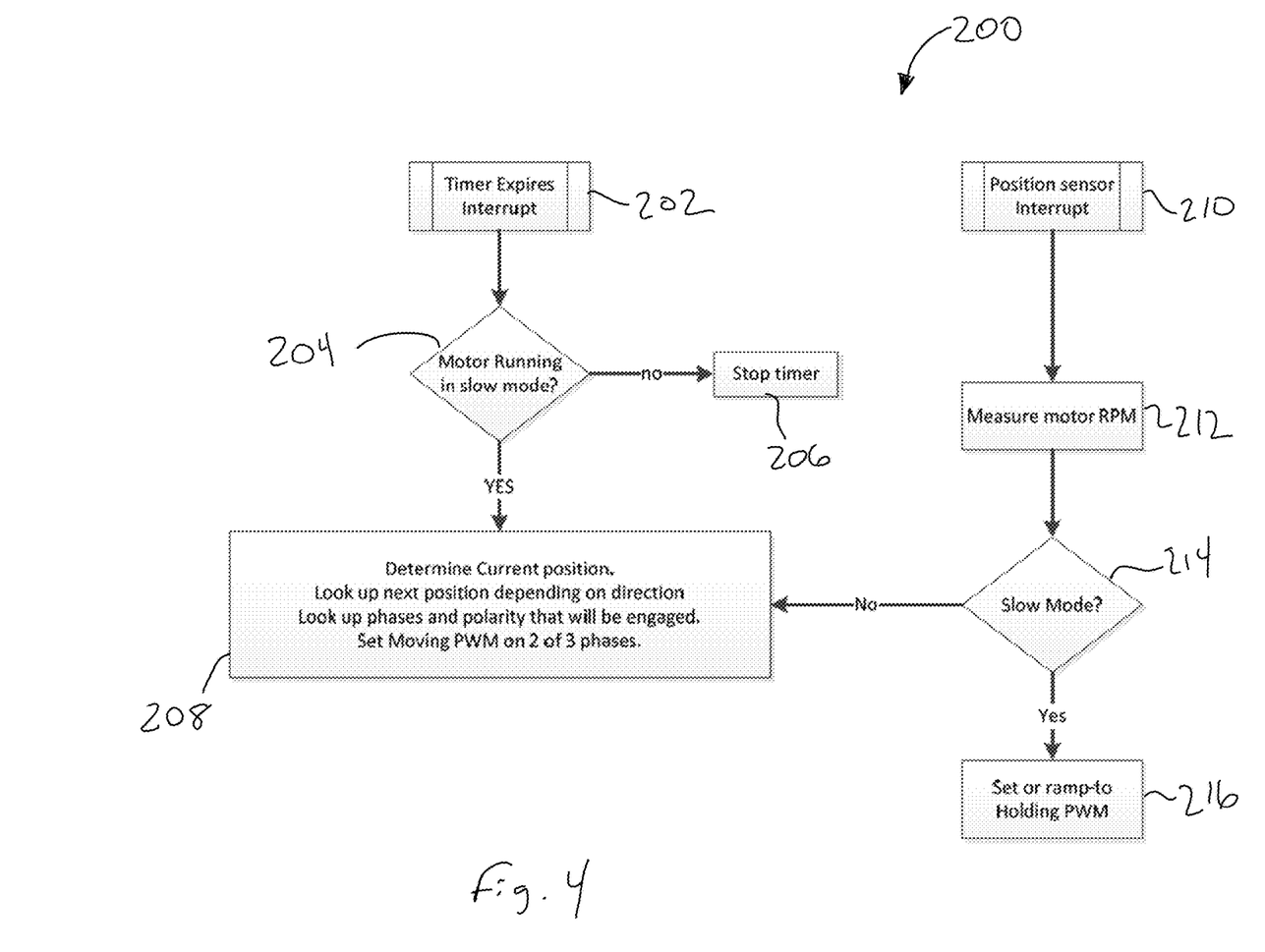
FIG. 4 is a flow chart of a further exemplary method for operating the motor controller of FIG. 1.

FIG. 4 illustrates an exemplary method 200 executed by the motor controller 26 to operate the motor 12 in the first mode. At step 202, the timer preferably triggers an interrupt signal to the processor 30, after which the motor controller 26 preferably checks that the motor 12 is still to be in the first mode (step 204). If not, at step 206 the motor controller 26 may stop the timer. If, on the other hand, the answer at step 204 is "yes," the motor controller 26 preferably moves to step 208 to determine the current position of the brushless DC motor 40, determine the next position depending on the rotation direction, determine the phases 38 and polarities to be applied, and apply the first "moving" PWM setting accordingly.

At step 210, an interrupt is preferably sent to the processor 30 from one or more position sensors 42, which indicates that the brushless DC motor 40 has reached its next position. At step 212, the motor controller 26 may determine the speed of the brushless DC motor 40. At step 214, the motor controller 26 preferably checks that the motor 12 is still to be in the first mode. If so, the motor controller 26 preferably sets or ramps to the second "holding" PWM setting at step 216. At this point, the motor controller 26 preferably awaits the next timer interrupt at step 202 and repeats the process. If, at step 214 the motor controller 26 determines that the motor 12 is not to be in the first mode, the motor controller 26 reverts to step 208 and preferably operates in the second mode thereafter.

Figure 5A:
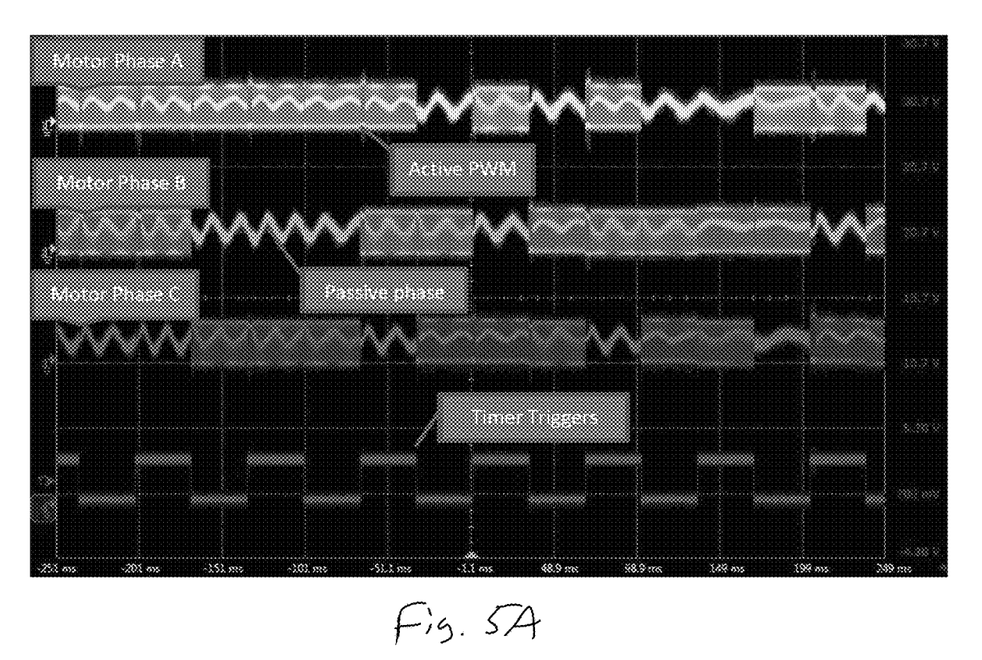
FIG. 5A is an image of an oscilloscope trace for three phases of a motor and a timer under control in accordance with an example embodiment.

FIG. 5A is an image of an exemplary oscilloscope trace for three phases of a motor 12 running in accordance with an embodiment of the present invention. The brushless DC motor 40 in this example is running at approximately 60 RPM (1 Hz). FIG. 5A shows three motor phases A, B, and C. As can be seen in the figure, the PWM is applied to two of the three phases A, B, C at any one time. FIG. 5A further shows the timer pulse waveform, which reverses polarity periodically. Each pulse coincides with active and passive periods of various combinations of the three phases A, B, C.

Figure 5B:
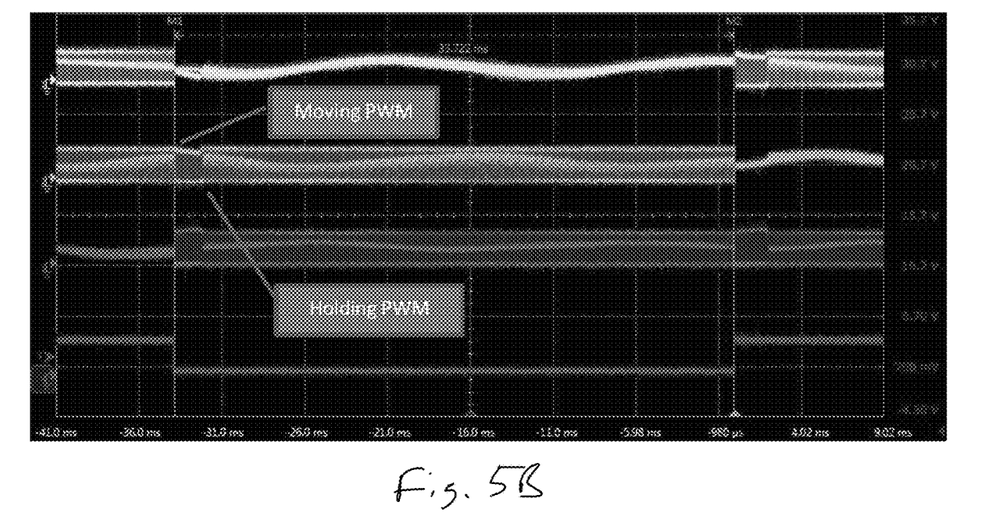
FIG. 5B is an enlarged portion of the oscilloscope trace of FIG. 5A.

FIG. 5B is an enlarged image to focus on one pulse duration of the timer waveform. In FIG. 5B, phase A is passive for the duration of the complete visible timer pulse, while phases B and C are active. The timer pulse is approximately 33 milliseconds. In phases B and C, the first PWM setting is applied initially by the motor controller 26, triggered by the timer pulse, to move the brushless DC motor 40 to its next position. In this example, the first PWM setting is applied for approximately 2 milliseconds. Afterward, for the duration of the timer pulse, the second PWM setting is applied to both phases B and C, to hold the brushless DC motor 40 in position.

Figure 5C:
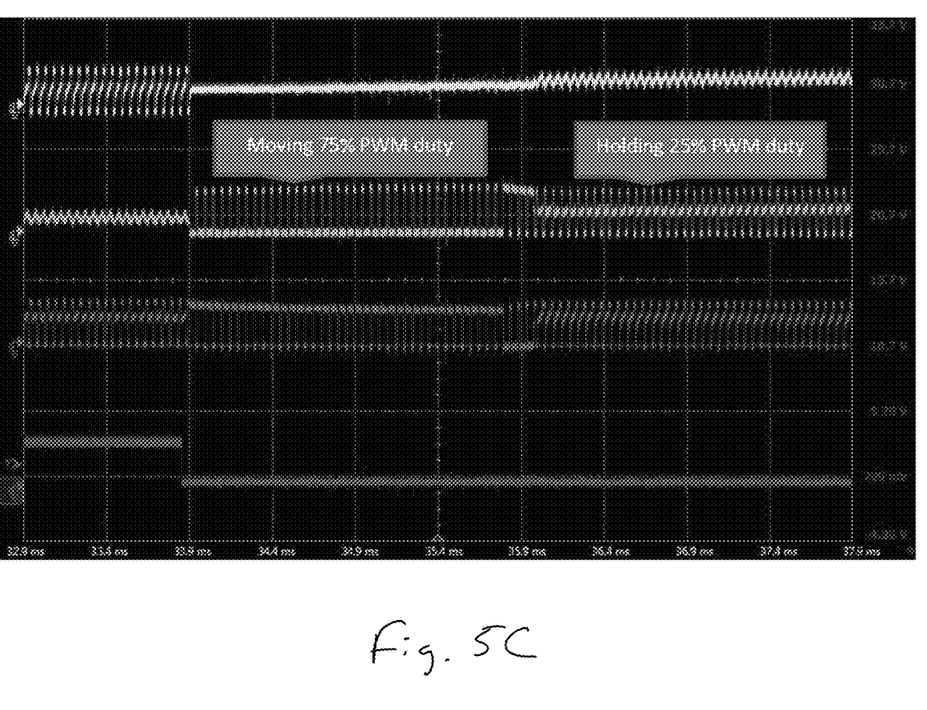
FIG. 5C is an enlarged portion of the oscilloscope trace of FIG. 5B.

FIG. 5C is an even further enlarged image to more clearly show the difference between the first and second PWM settings as applied to phases B and C. In the example shown in FIG. 5C, the first PWM setting is at about 75% duty cycle, while the second PWM setting is at about 25% duty cycle.

While the embodiments described herein have been directed to a motor implemented within a fire suppression system, operation of a motor in the fashion described above is equally applicable to other applications wherein a low speed, high torque motor may be required. Moreover, operation of the motor as described herein is not limited to applications which are vehicle-mounted and can be utilized with any power source driving the motor.

The fire suppression system 10 described above may further include improved additive functionality. Referring to FIGS. 1 and 6, the additive proportioning system 20 may include a source selector valve 23 that allows the user to connect one or more of the on-board tanks 21a, 21b or one or more off-board containers 25 (FIG. 6) to an input of the foam pump 24. The source selector valve 23 may be actuated by the user either manually, for example by a handle (not shown) at the source selector valve 23, or electronically, for example via the operator interface 28 or another electronic control panel in communication with the source selector valve 23.

For connection to an off-board container 25, such as a pail, drum, tote tank, or the like, the source selector valve 23 may include an off-board hose or other conduit 27 that is coupled at one end to the source selector valve 23. An opposing end of the off-board hose 27 may include a suction wand 29 configured to be submerged within the foamant 22c to facilitate removal thereof from the off-board container 25 as the foam pump 24 pulls a vacuum. When the off-board container 25 is empty, the foam pump 24 will lose prime as air fills the off-board hose 25 and subsequent intake plumbing leading to the foam pump 24. A bypass valve 31 is therefore preferably provided at the foam pump 24 (or at least between the foam pump 24 and the injection point into the discharge conduit 18) to allow the air to escape via a bypass hose 33, rather than being pushed into the water stream.

It is preferred that the fire suppression system 10 be configured to open the bypass valve 31 upon detection of one or more conditions indicating an empty off-board container 25 or loss of prime, and then close the bypass valve 31 upon re-establishing prime to resume foam proportioning to the water stream. One or more sensors or the like may therefore be provided to measure conditions indicative of loss of prime. For example, a chemical flowmeter 17 (FIG. 1) may be placed in fluid communication with the foam injection conduit 13 to detect the foam flow rate in the foam injection conduit 13. A detected flow rate below a predetermined threshold, based on current operating conditions or the like, may indicate a loss of prime and trigger opening of the bypass valve. In another example, a pressure sensor 19 (FIG. 1) may be placed in fluid communication with the foam injection conduit 13 to detect discharge pressure from the foam pump 24, with a detected drop below the water pressure in the discharge conduit 18 signaling a loss of prime. In yet another example, the suction wand 29 may be provided with a tip sensor 35 (FIG. 6) capable of discriminating between air and liquid. For example, the tip sensor 35 may be an optical, inductive, or capacitive-type sensor configured to measure a fill level of the off-board container 25. An example of such a sensor is the CAP-300 Capacitive Level Sensor available from Gems Sensors, Inc. Other types of sensors (e.g., float sensors or the like—not shown) could be used as well, including those not directly coupled to other components of the system 10, but which could be in wireless communication therewith to communicate condition information. While the examples given above rely on a single sensor to detect conditions indicative of prime loss, the flowmeter 17, pressure sensor 19, the tip sensor 35, and/or others may be used together in combination to prevent false indications.

The one or more sensors (e.g., flowmeter 17, pressure sensor 19, tip sensor 35, and/or the like) are preferably in wired or wireless communication with a processor 37, or another similar type of controller, application specific integrated circuit (ASIC) or the like, which preferably receives and acts upon the data received from the sensors. For example, based on received flow data from the flowmeter 17, the processor 37 can deduce the loss of prime by the foam pump 24 and perform the necessary responsive operations. The processor 37 is preferably housed with the operator interface 28, although the processor 37 may alternatively be located within the motor controller 26 or separately housed elsewhere in the system 10. While shown as a single processor 37, the functionality may also be divided among multiple devices. In other embodiments, the processor 30 of the motor controller 26 may receive the sensor data and perform the functions described herein.

The processor 37 is also preferably in communication (wired or wireless) with the source selector valve 23. Upon determining that the source selector valve 23 is drawing from the off-board container 25 and that the foam pump 24 performance is deteriorating based on data from the one or more sensors, the processor 37 preferably issues an alert to the user that the currently selected off-board container 25 is empty. The alert may be visual or audible, and may be made through the operator interface 28, although the alert may additionally or alternatively be sent through other system components or external devices.

The processor 37 is preferably also in communication with the foam pump 24 (e.g., directly or via the motor controller 26—although this requirement is moot where the processor 37 is the processor 30 of the motor controller 26) and the bypass valve 31. In response to detection of the conditions mentioned above (i.e., drawing from off-board container 25 and sensor data indicating depleted foam pump 24 performance), the processor 37 preferably causes the bypass valve 31 to open to vent air being drawn into the foam pump 24 via the off-board hose 27 in an empty off-board container 25. The processor 37 may also cause the motor 12 to change its operating status to account for the fact that foamant 22c is no longer being drawn. As but one example, operating speed of the foam pump 24 may be reduced.

Once the user exchanges the depleted off-board container 25 for another and the off-board hose 27 (e.g., via the suction wand 29) is submerged, the foam pump 24 may begin to regain its prime, which preferably the processor 37 is able to detect. In one example, the pressure sensor 19 detects a rise in pressure in the injection conduit 13. The foam pump 24 may generate more pressure when primed, even when the bypass valve 31 is open, preferably because the bypass valve 31 will be small in size compared to the foam pump 24 and the surrounding plumbing. Accordingly, upon reaching a predetermined pressure level, the processor 37 may cause the bypass valve 31 to close so the foam pump 24 can resume normal operation. Once the bypass valve 31 is closed, preferably the pressure level detected by the pressure sensor 19 will be greater than or equal to the pressure in the discharge conduit 18. If not, the processor 37 may determine that the foam pump 24 has not fully primed and may re-open the bypass valve 31 briefly to allow more air to escape the system. In some embodiments, the processor 37 may attempt this brief re-opening of the bypass valve 31 a predetermined number of times (e.g., three), wherein if the pressure detected by the pressure sensor 19 is still insufficient, a warning may be issued to the user to check connections. Pressure of the water in the discharge conduit 18 can be obtained, for example, from a pump pressure controller such as the Class1 Sentry Series or the TPG (Total Pressure Governor), which are conventionally known.

In another example, the bypass valve 31 may be located downstream of the flowmeter 17. When the flowmeter 17 detects increased outgoing flow from the foam pump 24, the processor 37 may determine that prime is restored and the bypass valve 31 may be closed. In yet other examples, other methods of detecting that prime has been restored to the foam pump 24 may be used to allow the processor 37 to close the bypass valve 31, including combinations of the foregoing to prevent false indications of restored prime condition. The processor 37 may also, in conjunction with closing the bypass valve 31, adjust any necessary motor 12 parameters, such as by increasing foam pump 24 speed or the like. In still other embodiments, the user may manually close the bypass valve 31 in response to the processor 37 outputting an alert that prime of the foam pump 24 has been restored.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A system comprising:
   a brushless direct current electric (BLDC) motor having a plurality of phases; and
   a motor controller operatively connected to the plurality of phases of the BLDC motor and configured to selectively power rotation of the BLDC motor via the plurality of phases in a first mode and a second mode, wherein when the motor controller powers rotation of the BLDC motor in the first mode, the motor controller is configured to
   (a) determine a current rotational position of the BLDC motor,
   (b) determine a subsequent rotational position of the BLDC motor to which the BLDC motor is to be rotated,
   (c) apply a first pulse width modulation (PWM) setting to one or more of the plurality of phases to cause the BLDC motor to rotate toward the subsequent rotational position,
   (d) responsive to detecting that the BLDC motor has reached the subsequent rotational position, apply a second PWM setting different from the first PWM setting to the one or more of the plurality of phases until expiration of a timer of predetermined duration, and
   (e) after expiration of the timer, return to step (a), and
   wherein when the motor controller powers rotation of the BLDC motor in the second mode, the motor controller is configured to:
   (i) determine a current rotational position of the BLDC motor,
   (ii) determine a subsequent rotational position of the BLDC motor to which the BLDC motor is to be rotated,
   (iii) apply a third PWM setting to one or more of the plurality of phases to cause the BLDC motor to rotate toward the subsequent rotational position, and
   (iv) responsive to detecting that the BLDC motor has reached the subsequent rotational position, return to step (i).

2. The system of claim 1, further comprising:
   a foam pump having an input configured for fluid communication with at least one additive source and an output configured for fluid communication with a discharge conduit, the foam pump being driven by the BLDC motor to inject one or more chemical additives from the at least one additive source into the discharge conduit.

3. The system of claim 2, wherein the BLDC motor and the foam pump are provided in a common housing.

4. The system of claim 2, further comprising a source selector valve disposed upstream of the foam pump input and configured to enable selection of one of a plurality of additive sources for fluid communication with the foam pump input.

5. The system of claim 1, further comprising a plurality of position sensors operatively connected to the motor controller and configured to detect the current rotational position of the BLDC motor.

6. The system of claim 1, wherein the third PWM setting is different from the first and second PWM settings.

7. A fire suppression system comprising:
   a motor;
   a foam pump having an input configured for fluid communication with at least one off-board additive container and an output configured for fluid communication with a discharge conduit, the foam pump being driven by the motor to inject one or more chemical additives from the off-board additive container into the discharge conduit;
   a bypass valve in fluid communication with the output of the foam pump;
   one or more sensors configured to measure at least one operating condition of the foam pump; and
   a controller in communication with the one or more sensors and operatively connected to the bypass valve, the controller being configured to determine, based on data received from the one or more sensors regarding the at least one operating condition of the foam pump, whether the foam pump is experiencing a loss of prime, the controller being further configured to open the bypass valve in response to determining the loss of prime by the foam pump.

8. The fire suppression system of claim 7, wherein the one or more sensors include a fill level sensor configured for placement within the off-board additive container, the fill level sensor being configured to measure a level of additive within the off-board additive container, the controller being configured to determine the loss of prime by the foam pump based at least on finding the measured additive level below a predetermined threshold.

9. The fire suppression system of claim 8, wherein the fill level sensor is one of an optical, inductive, or capacitive level sensor.

10. The fire suppression system of claim 7, wherein the controller is further configured to output an alert to the user in response to determining the loss of prime by the foam pump.

11. The fire suppression system of claim 10, wherein the alert is at least one of a visual or an audible alert.

12. The fire suppression system of claim 7, wherein the one or more sensors include a flowmeter disposed downstream of, and in fluid communication with, the output of the foam pump, the flowmeter being configured to measure a flow rate from the output of the foam pump, the controller being configured to determine the loss of prime by the foam pump based at least on finding the measured flow rate below a predetermined threshold.

13. The fire suppression system of claim 7, wherein the one or more sensors include a pressure sensor disposed downstream of, and in fluid communication with, the output of the foam pump, the pressure sensor being configured to measure a pressure level from the output of the foam pump, the controller being configured to determine the loss of prime by the foam pump based at least on finding the measured pressure level below a predetermined threshold.

14. The fire suppression system of claim 7, the controller being further configured to determine, based on data received from the one or more sensors regarding the at least one operating condition of the foam pump, whether the foam pump has regained prime, the controller being further configured to close the bypass valve in response to determining the regain of prime by the foam pump.

15. The fire suppression system of claim 7, the controller being further configured to reduce an operating speed of the foam pump in response to determining the loss of prime by the foam pump.

16. The fire suppression system of claim 7, wherein at least one of the one or more sensors is configured for wireless communication with the controller.

17. The fire suppression system of claim 7, further comprising a source selector valve disposed upstream of the foam pump input and configured to selectively enable and disable fluid communication between the off-board additive container and the input of the foam pump.

18. The fire suppression system of claim 7, further comprising an off-board conduit having a first end in fluid communication with the input of the foam pump and a second end fitted with a suction wand.

* * * * *